United States Patent
Kobayashi et al.

(10) Patent No.: US 6,579,488 B1
(45) Date of Patent: *Jun. 17, 2003

(54) PROCESS FOR PRODUCING A THERMOPLASTIC RESIN MOLDED ARTICLE

(75) Inventors: Yoshitaka Kobayashi, Ibaraki (JP); Nobuhiro Usui, Takatsuki (JP); Takeo Kitayama, Ibaraki (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 280 days.

This patent is subject to a terminal disclaimer.

(21) Appl. No.: 09/644,564

(22) Filed: Aug. 24, 2000

(30) Foreign Application Priority Data

Aug. 27, 1999 (JP) .......................................... 11-241395

(51) Int. Cl.⁷ .......................... B29C 45/04; B29C 45/14
(52) U.S. Cl. ................. 264/266; 264/328.7; 264/328.9; 264/161
(58) Field of Search ................................ 264/255, 259, 264/266, 275, 316, 328.7, 328.8, 510, 513, 299, 319, 328.9, 161

(56) References Cited

U.S. PATENT DOCUMENTS

| | | | | |
|---|---|---|---|---|
| 4,091,057 A | * | 5/1978 | Weber | 264/2.2 |
| 5,178,708 A | * | 1/1993 | Hara et al. | 156/242 |
| 5,516,582 A | * | 5/1996 | Hikasa et al. | 428/319.9 |
| 5,770,134 A | * | 6/1998 | Hara et al. | 264/154 |
| 5,783,133 A | * | 7/1998 | Hara et al. | 264/261 |
| 5,820,813 A | * | 10/1998 | Hara et al. | 264/511 |
| 6,183,680 B1 | * | 2/2001 | Hara et al. | 264/163 |
| 6,203,744 B1 | * | 3/2001 | Hara et al. | 264/266 |
| 6,280,678 B1 | * | 8/2001 | Hara et al. | 264/511 |
| 6,413,461 B1 | * | 7/2002 | Kobayashi et al. | 264/257 |

FOREIGN PATENT DOCUMENTS

EP 0 466 181 A1 1/1992

OTHER PUBLICATIONS

Abstract of JP H03–221424 A.
Abstract of JP H03–236917 A.
Abstract of JP H04–348919 A.

* cited by examiner

*Primary Examiner*—Angela Ortiz
(74) *Attorney, Agent, or Firm*—Fitch, Even, Tabin & Flannery

(57) ABSTRACT

The present process includes a mold for producing a thermoplastic resin molded article, comprising paired sliding female and male mold members, which mutually slide at the time of mold closing. A product-forming portion and a non-product-forming portion are provided in the cavity of the mold, the mold further including a resin-supplying opening. A gate portion located at a boundary between the product-forming portion and non-product-forming portion interconnects the two portions. At closing of the mold, the width of the gate at the product-forming side is less than the thickness of the formed product, and stepwise or continuously widens toward the non-product-forming side. Using this mold, a thermoplastic resin molded article, with or without a laminated skin material, can be molded in good efficiency and low cost, further having a non-product-forming portion, which can be readily trimmed from the product-forming portion.

3 Claims, 4 Drawing Sheets

(a)

<on an enlarged scale>

(b)

(c)

(d)

(e)

2

PROCESS FOR PRODUCING A THERMOPLASTIC RESIN MOLDED ARTICLE

BACKGROUND OF THE INVENTION

1. Field of the Invention

The present invention relates to a mold for producing a thermoplastic resin molded article and to a process for producing a thermoplastic resin molded article using the mold.

2. Description of the Prior Art

A thermoplastic resin molded article and a multi-layer thermoplastic resin molded article wherein a skin material is integrally laminated to the entire or a part of a surface of a substrate comprising a thermoplastic resin have been used in various fields including automobile interior parts (for example, a door trim and an instrument panel) and interior and exterior parts of household electrical appliances.

Heretofore, as a process for producing such thermoplastic resin molded articles, a variety of processes, for example, injection molding, injection press molding and the like have been known.

In such processes, however, it is difficult to perfectly prevent in the molded article, uneven brightness which is called a cold mark or wrinkles which occur in a molded article surface corresponding to the vicinity of the resin-supplying opening. This is typically because a molten thermoplastic resin is supplied from a resin-supplying opening provided in a mold cavity surface for forming a molded article and is formed into a desired shape. Although it may be thought that the temperature of a resin or mold can be raised for the purpose of overcoming such a problem, this results in a long cooling time in that there arises another problem of deterioration in the productivity.

Further, as a process for producing a multi-layer thermoplastic resin molded article, there have been known, for example, a process in which a skin material is laminated by adhesion, using an adhesive or the like, onto a surface of a molded article (substrate) which has been prepared beforehand by forming a thermoplastic resin into a predetermined shape by injection molding or the like, and a process in which a skin material is supplied to between paired mold members, a molten thermoplastic resin is thereafter supplied to between the mold members, and the thermoplastic resin is then formed into a predetermined shape simultaneously when skin material is laminated to the surface of the shaped thermoplastic resin.

However, in such processes, the former includes complex procedures and has problems on human bodies, environment and the like caused by solvents contained in the adhesive. The latter has merit in that the formation of the substrate and the lamination of the skin material to a surface thereof can be achieved simultaneously. However, the latter has a problem in that when the molten thermoplastic resin is supplied from the resin-supplying opening provided in the mold, heat or supplying pressure to the molten thermoplastic resin causes a rip of the skin material. In the case of some types of skin materials, such a process causes crushing of a foamed layer which is a cushion layer, falling down of fuzz which induces the growth of unevenness in a surface of a product, an unsatisfactory feeling of cushion, difference in color, damage of texture and the like. Against such problems, there has been known a method for protecting a skin material from heat or supplying pressure at the time of resin supplying by providing a backing layer to a rear surface of the skin material. This method, however, has other problems of inducing poor shapability and mounting cost.

As a measure against these problems, there has been proposed a process using a mold in which a product-forming portion and a non-product-forming portion are interconnected with each other via a gate portion, the process comprising the steps of supplying a molten thermoplastic resin to the non-product-forming portion from a resin-supplying opening provided in the non-product-forming portion when the cavity clearance is not less than a thickness of a product to be formed, and closing the mold to form the molten thermoplastic resin (Japanese Patent Laid-Open Publication No. Hei 4-348919).

However, this method has a problem in that it is difficult for a non-product portion to be trimmed off from a product portion after molding since the gate portion, which connects the product-forming portion and the non-product-forming portion and functions as a resin path from the non-product-forming portion to the product-forming portion, has a constant thickness (FIGS. 5 and 11).

SUMMARY OF THE INVENTION

Under such circumstances, the present inventors have developed a mold for producing, in good efficiency and low cost, a thermoplastic resin molded article having a good surface appearance when a skin material is laminated as well as when no skin material is laminated thereto and having a non-product-forming portion which can readily be trimmed off from its product-forming portion after molding. They have also studied on a process for producing a thermoplastic resin molded article using the mold, and as a result, have reached the present invention.

The present invention provides a mold for producing a thermoplastic resin molded article, comprising paired female and male mold members wherein an outer peripheral surface of the male mold member and an inner peripheral surface of the female mold member, respectively, are sliding parts which mutually slide at the time of mold closing, and a product-forming portion and a non-product-forming portion, in the cavity thereof, in which said non-product-forming portion comprises a molten resin supplying opening at the mold surface thereof and said non-product-forming portion is interconnected to said product-forming portion by a gate portion which is a boundary between said non-product-forming portion and said product-forming portion, wherein at the time of mold closing, a width of said gate width at the product-forming-portion-side end of said gate portion, is less than the thickness of a product to be formed and continuously or stepwise widens from the boundary toward the non-product-forming-portion-side end of said gate portion. The present invention also provides a process for producing a thermoplastic resin molded article using the mold of the above 1, comprising closing the mold, while or after supplying molten thermoplastic resin, from the molten resin supplying opening, in an opened state, at the mold surface of the non-product-forming portion to between the male and female mold members, in an opened state, flowing the molten thermoplastic resin from the non-product-forming portion to the product-forming portion, packing the molten thermoplastic resin in the cavity, and cooling and solidifying the molten thermoplastic resin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

A description relating the mold for producing a thermoplastic resin molded article and the process for producing a thermoplastic resin molded article using the mold will be given as follows.

It should be noted that the processes shown below are examples of the present invention which do not limit the present invention.

Figure 1:
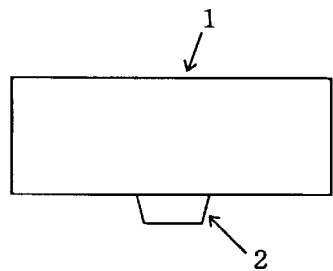
FIG. 1 is a plan view of an example of a thermoplastic resin molded article produced by the process of the present invention.
Figure 2:
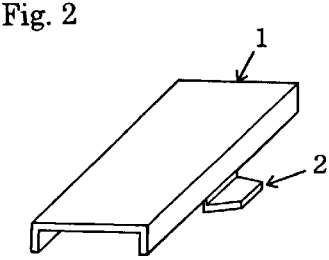
FIG. 2 is a perspective view of the example of the thermoplastic resin molded article shown in FIG. 1.

FIG. 1 shows a schematic plan view of an example of a thermoplastic resin molded article which has been molded by using the mold for producing a thermoplastic resin molded article according to the present invention and which has been released from the mold after the molding. FIG. 2 shows a perspective view of the molded article. The thermoplastic resin molded article comprises a product-forming portion (1) and a non-product-forming portion (2). The non-product-forming portion (2) may thereafter be either trimmed off from the product-forming portion (1) or folded down to the underneath surface of the product-forming portion (1).

Figure 4:
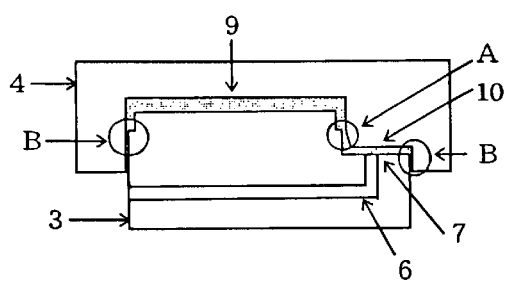
FIG. 4 is a schematic sectional view of an example of the mold of the present invention.
Figure 5:
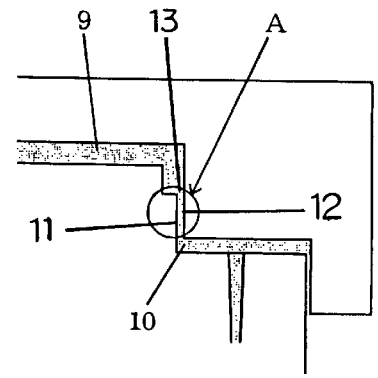
FIG. 5 is a partially enlarged view of a conventional mold.

FIG. 4 shows an example of the mold for producing a thermoplastic resin molded article according to the present invention using a schematic sectional view thereof.

This mold comprises paired female and male mold members wherein an outer peripheral surface of the male mold member (3) and an inner peripheral surface of the female mold member (4), respectively, are sliding parts (indicated by B in FIG. 4) which mutually slide. Further, this mold also has a product-forming portion (9) and a non-product-forming portion (10) in the cavity thereof.

A gate portion (indicated by A in FIG. 4), which is a boundary between the non-product-forming portion (10) and the product-forming portion, interconnects the product-forming portion (9) with the non-product-forming portion (10). In the mold surfaces of the non-product-forming portion (10), a molten resin-supplying opening (7) opens via a molten resin-supplying path (6) provided in either one of the female or male mold members (in FIG. 4, the male mold member).

The width of the gate at the product-forming-portion-side end (13) of the gate portion is, at the time of mold closing, less than the thickness of a product to be formed. The width of the gate is the clearance between the outer peripheral surface forming the gate portion (11) of the male mold member forming the gate portion (3) and the inner peripheral surface (12) of the female mold member forming the gate portion (4). The product-forming-portion-side end (13) locates at the end of the gate portion in the vicinity of the product-forming portion (9). Further, the width of the gate at the gate of widens from the boundary toward the non-product-forming portion-side end of the gate portion.

Figure 14:
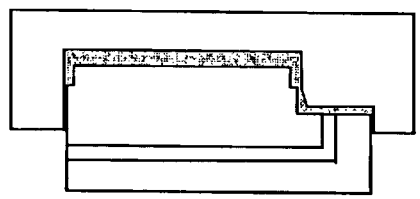
FIG. 14 shows an example of a structure of a gate portion of the mold of the present invention using a schematic sectional view.
Figure 14:
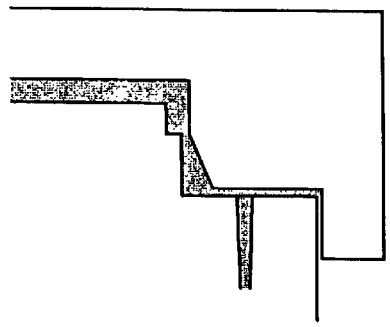
Figure 14:
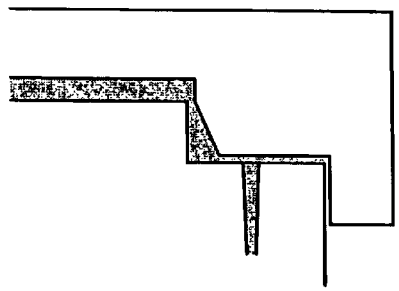
Figure 14:
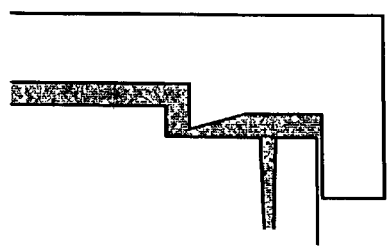
Figure 14:
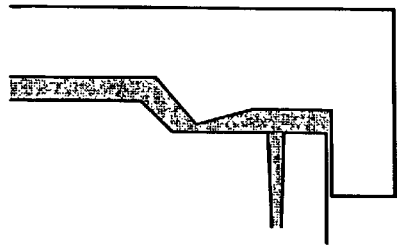
Figure 14:
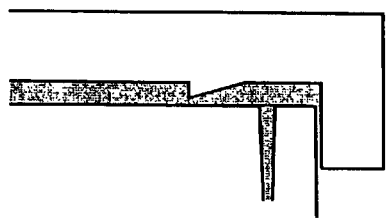

Further, a flow direction of the molten resin in the gate portion is not particularly limited. Optional directions, for example, a direction which is the same as the mold-sliding direction or a direction similar to the mold-sliding direction as illustrated in FIGS. 14(a) and (b), and a direction which is perpendicular to the mold-sliding direction or a direction similar to the direction which is perpendicular to the mold-sliding direction as illustrated in FIGS. 14(c), (d) and (e) may be selected depending on the shape of the product to be formed.

Figure 6:
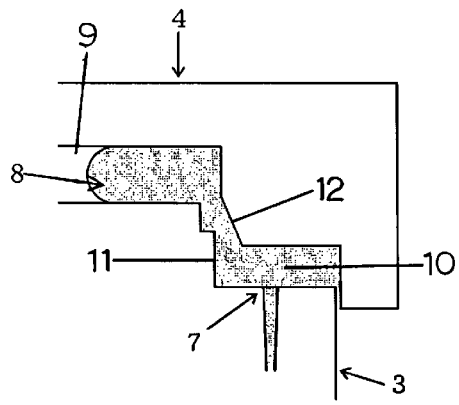
FIG. 6 shows a stage (before mold closing) in a production process according to the process of the present invention using a schematic partial sectional view of a mold.
Figure 7:
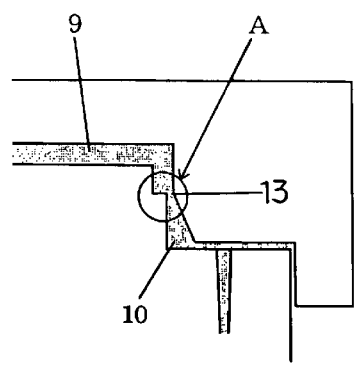
FIG. 7 shows a stage (at the completion of mold closing) in a production process according to the process of the present invention using a schematic partial sectional view of a mold.

FIGS. 6 and 7 show these situations of before and after the mold closing. FIG. 6 shows the state before the mold closing. FIG. 7 shows the state when the mold closing has been completed.

The width of the gate at the product-forming-portion-side end (13) of the gate portion when the mold closing has been completed is less than the thickness of the product to be formed, preferably less than ⅔ of the thickness of the product to be formed, and more preferably less than ½ of the thickness of the product to be formed.

In the present invention, the width of the gate at the product-forming-portion-side end (13) of the gate portion, is less than the thickness of the product to be formed. Further, the width of the gate widens continuously or stepwise from the boundary toward the non-product-forming end of the gate portion.

Figure 8:
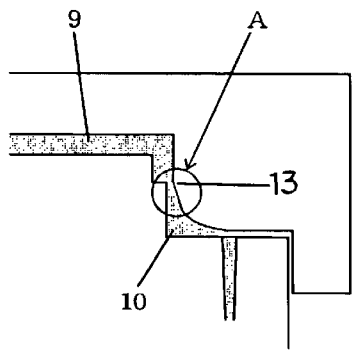
FIG. 8 shows an example of a structure of a gate portion of the mold of the present invention using a schematic sectional view.

Examples in which the width of the gate widens continuously include a case wherein the width of the gate widens linearly and continuously from the product-forming-portion-side end (13) of the gate portion toward the non-product-forming portion (10) as illustrated in FIGS. 6 and 7 and a case wherein the inner peripheral surface forming the gate portion (12) of the female mold member (4) forms a curved surface and which widens curvilinearly and continuously as illustrated in FIG. 8.

Figure 9:
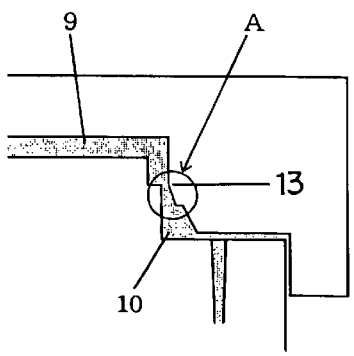
FIG. 9 shows an example of a structure of a gate portion of the mold of the present invention using a schematic sectional view.

Examples in which the width of the gate widens stepwise include a case wherein the inner peripheral surface forming the gate portion (12) of the female mold member (4) is stepwise so that the width of the gate widens stepwise toward the non-product-forming portion (10) as illustrated in FIG. 9.

In any of such cases, there may be some regions throughout the gate portion in which the width of the gate is identical as long as there is not any region wherein the width of the gate is less in the non-product-forming-portion side end of the gate portion than in the product-forming-portion-side end of the gate portion. It, however, is preferable that the mode of increasing the width of the gate is designed so that the width of the gate increases linearly or curvilinearly with smoothness from the viewpoint of flowability of a molten thermoplastic resin from the non-product-forming portion to the product-forming portion.

The molten resin supplying opening (7) is provided in the non-product-forming portion of the mold in order to prevent the growth of a cold mark in a product surface or prevent when a skin material is laminated, a rip of a skin material and crushing of a foamed layer so as to obtain a product of good appearance. However, depending on the shape, size and the like of a molded article, a molten resin-supplying opening may also be additionally provided in the product-forming portion, thereby supplementarily supplying a molten resin from the additional molten resin-supplying opening.

The non-product-forming portion and the product-forming portion, respectively, may have either one molten resin-supplying opening or a plurality of molten resin-supplying openings.

Next, a process for producing a thermoplastic resin molded article using such a mold will be explained.

A molten thermoplastic resin (8) may be supplied through a molten resin-supplying opening (7) which opens in a mold surface of the non-product-forming portion of the male mold member (3) while keeping a state where a cavity clearance between the female and male mold members in the product-forming portion is greater than the thickness of the final product tp be formed and the sliding parts (shown by B in FIG. 4) of the female and male mold members define a shear edge clearance (FIG. 6).

In this state, since a cavity clearance between the male and female mold members is greater than the thickness of the final product to be formed, as illustrated in FIG. 6, a cavity clearance between the female and male mold members at a product-forming-portion-side end of the gate portion, which corresponds to the boundary between the product-forming portion (9) and the non-product-forming portion (10) in the gate portion, is greater than that when the mold is closed. Therefore, a molten thermoplastic resin which has been supplied into the non-product-forming portion easily flows toward the product-forming portion without receiving an unacceptable amount of shear at the gate portion.

When mold closing is conducted after the completion of supplying a predetermined amount of a molten thermoplastic resin, a cavity clearance between the female and male mold members at the product-forming-portion-side end of the gate portion, which corresponds to the boundary between the product-forming portion (9) and the non-product-forming portion (10) in the gate portion decreases gradually with the mold closing. At the same time, a predetermined amount of the molten thermoplastic resin which has been supplied to the non-product-forming portion (10) and which accumulated there flows and moves toward the product-forming portion while passing through the gate portion. When the mold closing has been proceeded until the cavity clearance between the male and female mold members is the thickness of the final product to be formed, both the product-forming portion (9) and the non-product-forming portion (10) have been fully filled with the molten thermoplastic resin and the mold closing has been completed (FIG. 7).

The mold closing may be conducted after the molten thermoplastic resin has been supplied as mentioned above and also may be commenced as the molten thermoplastic resin is supplied and be completed upon or after the completion of supplying the molten thermoplastic resin.

Further, although a mold closing direction shown in the Figures is vertical, it may be horizontal depending on the mold apparatus for the mold. There is no limitation with respect to a mold closing direction.

When the mold closing has been completed, the width of the gate at the product-forming-portion-side end (13) of the gate portion, which corresponds to the boundary between the product-forming portion (9) and the non-product-forming portion (10), is less than the thickness of the product to be formed and is least throughout the gate portion (FIG. 7).

At the completion of mold closing, if the width of the gate at the product-forming-portion-side end (13) of the gate portion, which corresponds to the boundary between the product-forming portion (9) and non-product-forming portion (10), is equal to or greater than the thickness of the product to be formed, it will be difficult for the non-product portion with the gate portion, for example, which is a portion from the product-portion-forming-side end portion (13) of the gate portion, to be folded or to be trimmed off.

A thermoplastic resin molded article shown in FIGS. 1 and 2 can be obtained by cooling and solidifying the thermoplastic resin and opening the female and male mold members after the completion of the mold closing.

Since the thus obtained molded article at its boundary between the product portion (1) and the non-product portion (2) has a thickness less than the product thickness and that is thin locally, the non-product portion can be trimmed off or folded with extreme ease.

Figure 3:
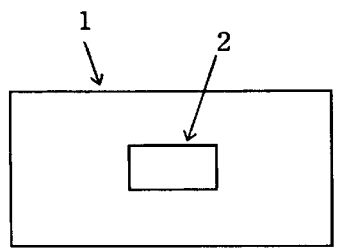
FIG. 3 is a plan view of an example of a thermoplastic resin molded article produced by the process of the present invention, viewed from its non-product-forming portion side.

In the previous explanation, an example wherein the non-product-forming portion (3) is provided to the periphery of the product-forming portion (1) as shown in FIGS. 1 and 2 has been illustrated, but some products may have the non-product-forming portion at the inner regions of any one of the surfaces of the product-forming portion as shown in FIG. 3.

As for a position where the non-product-forming portion is provided, for example, when the non-product-forming portion (3) is provided to a periphery of the product-forming portion (1), the non-product-forming portion can be formed around the entire periphery of the product-forming portion. It, however, is generally provided to a part of the periphery of the product-forming portion as shown in FIGS. 1 and 2, in general. With respect to the number of the non-product-forming portion, one non-product-forming portion is usually sufficient, but a plurality of non-product-forming portions may be formed at adequate positions depending on the size and the shape of a product to be formed.

There is no restraint on the size (volume) of the non-product-forming portion and an arbitrary size may be selected. However, as shown in the Figures, a size allowing the molten thermoplastic resin supplied to flow into the product-forming portion through the gate portion is large enough and a size larger than necessary is not required.

The following is a description on a process for producing a thermoplastic resin molded article wherein a skin material or the like is laminated on its surface. This process is basically similar as that previously explained though there is a difference that a skin material is beforehand supplied to between the male and female mold members.

Figure 10:
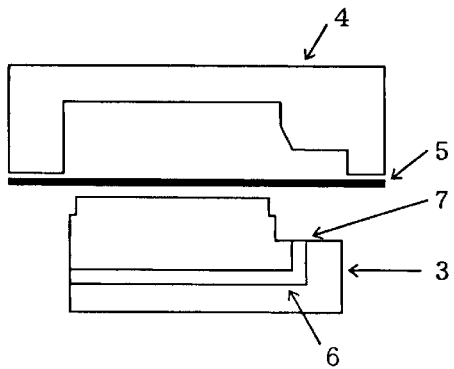
FIG. 10 shows a stage in a production process according to the process of the present invention in the case of laminating a skin material using a schematic sectional view of a mold.
Figure 11:
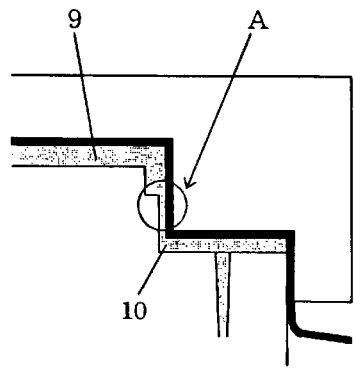
FIG. 11 is a schematic partial sectional view of a conventional mold.

FIG. 10 shows a state where a skin material (5) has been supplied to between the female and male mold members in an opened state.

Although the skin material may be placed on a surface of any of the female and male mold members, it may be fixed with pins or the like to a body of the male or female mold members or a skin material-fixing frame (not shown in Figs.) provided around the mold members.

Some skin materials may be used after preheating or preforming depending upon a shape of a product to be formed.

Figure 12:
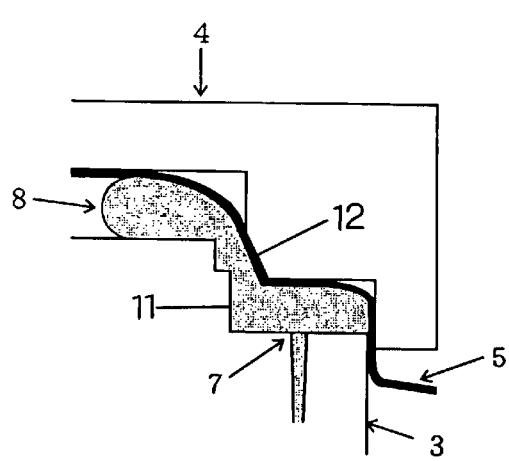
FIG. 12 shows a stage in a production process according to the process of the present invention in the case of laminating a skin material using a schematic partial sectional view of a mold.

After supplying a skin material, a molten thermoplastic resin (8) may be supplied through a molten resin-supplying opening (7) which opens in a mold surface of the non-product-forming portion of the male mold member (3) while keeping a state where a cavity clearance between the female and male mold members in the product-forming portion is greater than the thickness of the final product and the sliding parts of the female and male mold members define a shear edge clearance (FIG. 12) in the same manner as previously shown in FIG. 6.

In this state, a cavity clearance between the female and male mold members at the product-forming-portion-side end (13) of the gate portion, which corresponds to the boundary between the product-forming portion (9) and the product-forming portion (10) in the gate portion is greater than that when the mold is closed. Therefore, the molten thermoplastic resin which has been supplied into the non-product-forming portion easily flows toward the product-forming portion without receiving an unacceptable amount of shear when it passes through the boundary. Further, the skin material placed corresponding to the product-forming portion is not directly affected by heat or supplying pressure of resin supplying. This can result in a reduction of damage such as a rip of the skin material and crushing of a foamed layer.

Figure 13:
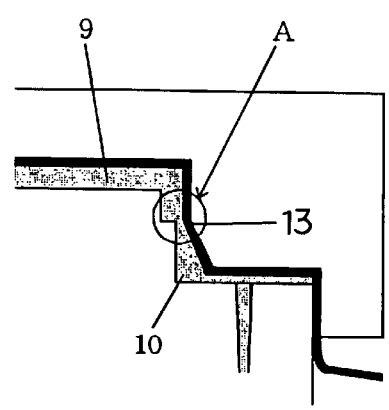
FIG. 13 shows a stage in a production process according to the process of the present invention in the case of laminating a skin material using a schematic partial sectional view of a mold.

In the same manner as previously mentioned, when a predetermined amount of a molten thermoplastic resin is supplied to the non-product-forming portion (10) and the mold is closed to the thickness of the final product, both the product-forming portion (9) and the non-product forming portion (10) are fully filled with the molten thermoplastic resin (FIG. 13).

Also in this case, the mold closing may be conducted after the molten thermoplastic resin has been supplied and also may be commenced as the molten thermoplastic resin is supplied and be completed upon or after the completion of supplying the molten thermoplastic resin just as in the case previously mentioned.

A thermoplastic resin molded article wherein a skin material is integrally laminated to a thermoplastic resin substrate can be obtained by cooling and solidifying the thermoplastic resin and opening the female and male mold members after the completion of the mold closing.

The skin material-laminated thermoplastic resin molded article removed from the mold may be finished by trimming off the non-productforming portion from the bordering between the product portion (1) and the non-product portion (2) or by folding the non-product-forming portion, in the same manner as previously mentioned.

A thermoplastic resin to be applied for the processes of the present invention may be any one which is usually used in compression molding, extrusion molding, injection molding or the like. Examples of the thermoplastic resin includes general thermoplastic resins such as polyethylene, polypropylene, acrylonitrile-styrene-butadiene copolymers, polystyrene, polyamide such as nylon, polyvinyl chloride, polycarbonate, acrylic resins, styrene-butadiene block copolymers and the like, thermoplastic elastomers such as EPM and EPDM, mixtures thereof, and polymer alloys using these materials. The thermoplastic resin may be either foamable or non-foamable.

Such a thermoplastic resin may additionally contain reinforcing fiber generally used such as glass fiber or a filler such as an inorganic or organic filler, if necessary. Of course, it may also contain an additive conventionally used such as pigments, lubricants, antistatic agents and stabilizers, as appropriate.

Examples of a skin material include woven fabric or knit fabric such as moquette and tricot, non-woven fabric such as a needle punched carpet, metal foil, sheets or films comprising a thermoplastic resin or thermoplastic elastomer.

Such a skin material may be a laminated skin material having two layers or three or more layers wherein a foamed layer or a backing layer is, if necessary, laminated as appropriate.

Examples of a foamed layer applied in such a case include foamed material of polyolefin such as polyethylene and polypropylene, soft or semi-rigid foamed polyurethane, and the like.

As a backing layer, non-woven fabric, sheets or films comprising synthetic resins and the like may be used.

Examples of fibers constituting the non-woven fabric include natural fibers such as cotton, wool, silk and hemp, synthetic fibers such as polyamide, polyester and nylon, and the like. Non-woven fabrics prepared from one or a combination of these fibers by various methods are used. For example, non-woven fabrics of a needle punched type, a thermal bonded type, a span bonded type, a melt blow type, a span lace type and the like may be used.

Examples of the sheets or films made of synthetic resin include sheets or films made of a thermoplastic resin such as polypropylene and polyethylene as well as a polyolefin-based thermoplastic elastomer. Materials having a weldability to a thermoplastic resin which are used as a substrate resin are preferably used.

When a thermoplastic resin molded article is produced using the mold of the present invention, a thermoplastic resin molded article having good surface appearance when a skin material is laminated as well as when no skin material is laminated and having a non-product-forming portion which can readily be folded or trimmed off from its product-forming portion after molding can be produced in good efficiency and in low cost.

What is claimed is:

1. A process for producing a thermoplastic resin molded article using a mold comprised of paired female and male mold members wherein an outer peripheral surface of the male mold member and an inner peripheral surface of the female mold member, respectively, are sliding parts which mutually slide at the time of mold closing; and a product-forming portion and a non-product-forming portion, in the cavity thereof, in which said non-product-forming portion comprises a molten resin supplying opening at the mold surface thereof and said non-product-forming portion is interconnected to said product-forming portion by a gate portion which is a boundary between said non-product-forming portion and said product-forming portion; wherein at the time of mold closing, a width of said gate at the product-forming-portion-side end of said gate portion is less than the thickness of a product to be formed and stepwise or continuously widens from the boundary toward the non-product-forming-portion-side end of said gate portion, the process comprising:

closing the mold, while or after supplying molten thermoplastic resin, from the molten resin supplying opening, in an opened state, at the mold surface of the non-product-forming portion to between the male and female mold members in an opened state;

flowing the molten thermoplastic resin from the non-product-forming portion to the product-forming portion, packing the molten thermoplastic resin in the cavity; and cooling and solidifying the molten thermoplastic resin.

2. A process for producing a thermoplastic resin molded article wherein a skin material is integrally laminated using a mold comprised of paired female and male mold members wherein an outer peripheral surface of the male mold member and an inner peripheral surface of the female mold member, respectively, are sliding parts which mutually slide at the time of mold closing; and a product-forming portion and a non-product-forming portion, in the cavity thereof, in which said non-product-forming portion comprises a molten resin supplying opening at the mold surface thereof and said non-product-forming portion is interconnected to said product-forming portion by a gate portion which is a boundary between said non-product-forming portion and said product-forming portion; wherein at the time of mold closing, a width of said gate at the product-forming-portion-side end of said gate portion is less than the thickness of a product to be formed and stepwise or continuously widens from the boundary toward the non-product-forming-portion-side end of said gate portion, the process comprising:

after supplying a skin material to between the female and male mold members in an opened state, closing the mold, while or after supplying molten thermoplastic resin, from the molten resin supplying opening, in an opened state, at the mold surface of the non-product-forming portion to between the male and female mold members in an opened state;

flowing the molten thermoplastic resin from the non-product-forming portion to the product-forming portion, packing the molten thermoplastic resin in the cavity; and cooling and solidifying the molten thermoplastic resin.

3. The process according to claim 1 or 2, wherein in the mold the product-forming portion comprises at the mold surface thereof a molten resin supplying opening and the molten thermoplastic resin is supplied from the molten resin supplying opening, in an opened state, at the mold surface of the non-product-forming portion and from the molten resin supplying opening, in an opened state, at the mold surface of the product-forming portion.

* * * * *